(12) United States Patent
Millard et al.

(10) Patent No.: US 7,153,464 B2
(45) Date of Patent: Dec. 26, 2006

(54) METHOD OF MAKING POROUS CERAMIC MATRIX COMPOSITES

(75) Inventors: Michael Lee Millard, Cincinnati, OH (US); Horace Richardson, Jr., Cincinnati, OH (US)

(73) Assignee: General Electric Company, Schenectady, NY (US)

(*) Notice: Subject to any disclaimer, the term of this patent is extended or adjusted under 35 U.S.C. 154(b) by 219 days.

(21) Appl. No.: 10/725,279

(22) Filed: Dec. 1, 2003

(65) Prior Publication Data

US 2005/0118392 A1 Jun. 2, 2005

(51) Int. Cl.
  *B29C 33/76* (2006.01)
  *B32B 3/00* (2006.01)

(52) U.S. Cl. .............. 264/317; 264/45.1; 264/605; 264/241; 264/257

(58) Field of Classification Search ............ 264/41, 264/45.1, 603, 605, 610, 241, 257, 259, 261, 264/317; 156/148, 155, 89.25, 89.26
See application file for complete search history.

(56) References Cited

U.S. PATENT DOCUMENTS

| | | | |
|---|---|---|---|
| 4,069,157 A | 1/1978 | Hoover et al. | |
| 4,430,851 A * | 2/1984 | Sundet | 57/211 |
| 4,814,029 A | 3/1989 | Butcher | |
| 5,100,837 A | 3/1992 | Kuszyk | |
| 5,154,373 A | 10/1992 | Scott | |
| 5,181,549 A | 1/1993 | Shapovalov | |
| 5,187,008 A | 2/1993 | Haller et al. | |
| 5,196,271 A | 3/1993 | White et al. | |
| 5,225,015 A | 7/1993 | Allaire et al. | |
| 5,306,554 A * | 4/1994 | Harrison et al. | 428/293.4 |
| 5,382,458 A | 1/1995 | Bwivedi | |
| 5,407,727 A | 4/1995 | Newell | |
| 5,455,106 A | 10/1995 | Steffier | |
| 5,635,454 A | 6/1997 | Baker et al. | |
| 5,858,513 A | 1/1999 | Jessen | |
| 5,864,743 A | 1/1999 | Tuchinskiy et al. | |
| 5,916,510 A | 6/1999 | Jessen | |
| 6,004,500 A | 12/1999 | Safari et al. | |
| 6,025,048 A * | 2/2000 | Cutler et al. | 428/105 |
| 6,102,112 A | 8/2000 | Herzl | |
| 6,132,542 A * | 10/2000 | Cutler et al. | 156/89.11 |
| 6,450,450 B1 * | 9/2002 | MacDonald et al. | 244/126 |
| 6,863,980 B1 * | 3/2005 | Misciagna et al. | 428/408 |
| 6,914,022 B1 * | 7/2005 | Bell et al. | 442/270 |
| 2003/0008182 A1 * | 1/2003 | Saitoh et al. | 428/699 |
| 2004/0091736 A1 * | 5/2004 | DiChiara, Jr. | 428/689 |

* cited by examiner

*Primary Examiner*—Carlos Lopez
(74) *Attorney, Agent, or Firm*—McNees Wallace & Nurick LLC

(57) ABSTRACT

A ceramic matrix composite (CMC) structure, and method of forming same, the structure having internal air flow channels and cooling holes created by the process of sewing or stitching a fugitive fiber or thread into plies of ceramic cloth, preferably prior to consolidation of the ceramic cloth with a CMC slurry, followed by heating to convert the slurry material to a hardened ceramic component part of a predetermined shape. Upon heating the infiltrated and consolidated ceramic cloth to about between 1100 and 2100 degrees Fahrenheit, such as by hot pressing the structure containing the fugitive fibers therein, the fugitive fibers disintegrate, leaving channels and cooling holes wherever the stitched fugitive fiber or thread was previously located. Thus, the channels and cooling holes flow between plies as well as across the surface of the top and bottom plies.

20 Claims, 2 Drawing Sheets

METHOD OF MAKING POROUS CERAMIC MATRIX COMPOSITES

FIELD OF THE INVENTION

The present invention is directed to ceramic structures with holes and internal channels for cooling these structures, and to methods for making the holes and channels within and through the ceramic structures using stitched fugitive fibers in ceramic cloth to produce the holes and channels.

BACKGROUND OF THE INVENTION

Ceramic matrix composites (CMCs) have relatively low thermal conductivities and are thus well suited for use in high temperature environments for long periods of time. However, the low thermal conductivity poses a serious problem for use of CMC's in high temperature applications involving very rapid heat-up, such as the flowpath of a gas turbine engine. In applications such as turbine engines, the low thermal conductivity of CMCs causes high thermally-induced stresses in the component. Mathematically simplified, this relationship is represented by the equation $\sigma=E\alpha/K$; where $\sigma$ is the thermally-induced stress, E is the elastic modulus, $\alpha$ is the thermal expansion and K is the thermal conductivity.

The current method to reduce thermally induced stresses on CMCs in rapid heat-up environments is to incorporate cooling holes into the component. Current methods involve drilling of small cooling holes (~0.060 in.) at regular spacing throughout the whole CMC component. This usually requires thousands of holes even for relatively small parts. Laser drilling and ultrasonic drilling are the industry standards for drilling the holes. While both of these processes work well, both are time consuming and expensive, especially for complex-shaped components. Complex-shape components must be repeatedly repositioned, or "fixtured" to expose the desired part surface and to set the appropriate angle for drilling of each hole.

Cooling provided by drilled holes is very discrete or localized within the body of the CMC. Cooling resulting from these holes essentially works by providing a film of cooler air over the surface of the component, thereby reducing the surface temperature of the CMC part, which ultimately reduces the thermal gradient through the CMC. Holes may be blind holes (i.e., not perforating through the entire CMC and not connected to other holes or channels) through holes (perforated through the CMC but not connected to other cooling holes or channels) or (i.e., networked holer connected to other cooling holes or channels). Preferably, at least some of the holes are through holes to ensure proper film cooling.

Therefore, the need exists for a process wherein adequate internal cooling is promoted within the CMC part, and which is significantly less expensive than the current drilling processes.

SUMMARY OF THE INVENTION

The present invention comprises methods of providing a ceramic matrix composite (CMC) structure having a predetermined pattern of internal air flow holes and channels. The air flow holes and channels are created by sewing or stitching a fugitive fiber or thread into plies of prepregged ceramic cloth (a ceramic cloth that has been previously infiltrated with a ceramic slurry). An exemplary prepreg can be made by mixing a polymer substance that transforms upon heating to yield a ceramic phase with ceramic particles, both of which are mixed in a liquid vehicle to form a substantially uniform distribution in a matrix mixture slurry. This slurry is interspersed about the oxidation stable ceramic fibers, as a matrix mixture, to provide a prepreg element. Exemplary processes for making such base CMC prepregs and CMC components are described in U.S. Pat. Nos. 5,488,017 and 5,306,554, which are incorporated herein by reference.

The stitched prepreg is then laminated (also known as "consolidating") in a press with heated platens or autoclaved to form the shape of the component as well as to cure the matrix, followed by sintering to convert the slurry material to a hardened ceramic component. In the instant invention, the stitched fugitive fiber is burnt out during the sintering cycle leaving holes and flow channels through the plies of the ceramic cloth where the fiber was stitched, as well as across the surface of the top and bottom plies where the thread transitioned to the next stitch.

An object of this invention is to produce a relatively light ceramic structure containing holes and channels therein, the positioning and sizing of the holes and channels that are able to be predetermined, and that are able to be varied in a well-controlled fashion.

Another object of this invention is increased cooling flow capabilities for a ceramic structure having holes and channels yielding greater than 5 times the flow than for the same ceramic structure without holes and channels.

Another object of this invention is a process for making a ceramic structure containing a plurality of holes and channels therein, the positioning of such holes and channels that are able to be predetermined, and that are able to be varied in a well-controlled fashion.

These and other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
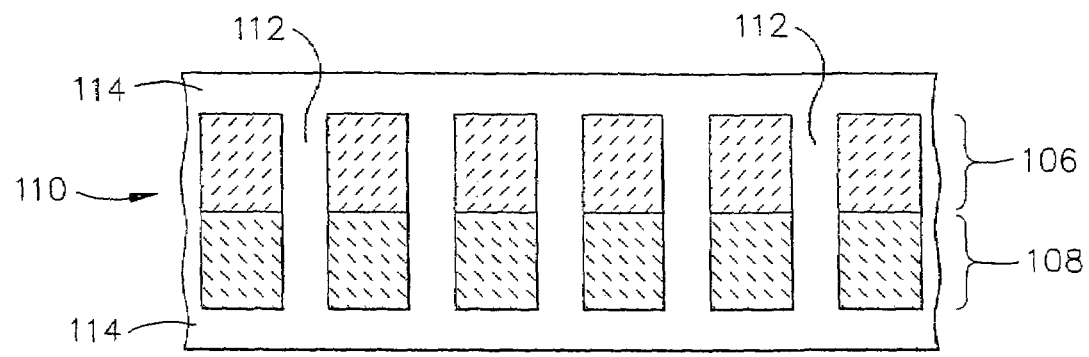
FIG. 1 is a cross-sectional view of a ceramic structure of the present invention illustrating cooling holes and cooling channels disposed in a ceramic matrix.

This invention pertains to a porous ceramic structure containing a preselected pattern of cooling holes and channels therein, and to a process for its preparation. The cooling holes and channels are provided to enable cooling of the part in high temperature environments such as the flowpath of a gas turbine engine, which reaches temperatures exceeding 1000° C.

The methods of the present invention involve the creation of cooling holes and channels during the formation of a CMC component part, such as the liners, centerbodies, aft vanes, etc of a gas turbine engine. The cooling holes and channels increase cooling airflow in and around the CMC component part during operation in a high temperature environment, thereby reducing the thermal gradient throughout the CMC component. In one embodiment, the methods involve sewing or stitching a fugitive thread into single ply or a plurality of laid up plies of a ceramic reinforcing element such as ceramic paper (thin sheets of non-oriented fibers), ceramic felts (thick sheets of non-oriented fibers, much like house insulation) and ceramic cloth (woven fibers). Stitching in this embodiment is performed prior to infiltrating, laminating and sintering the CMC component part. In other embodiments, the methods involve sewing or stitching a fugitive thread into single or laid up plies of previously prepregged ceramic paper, ceramic felts and/or ceramic cloth, followed by laminating and sintering. In both embodiments, the combination of cooling holes and channels formed when the fugitive thread decomposes during sintering to yield a structure with increased flow that results in increased cooling, without compromising structural integrity.

In the present invention, a fugitive thread (nylon, polyester and/or cotton sewing thread) is stitched into one or several plies of a ceramic reinforcing element. The number of plies that are stitched together determine how much through and cross flow is in the CMC and, therefore, how much surface and internal cooling is achieved. The best way to picture this is to consider a grid throughout the CMC since the stitched fugitive fibers run not only through the plies but also across the surface of the plies that were stitched together. If we stitch through all the plies, then the flow characteristics of the CMC will be similar to through-hole drilling. However, if the number of plies that are stitched together is less than half the number of plies and then these stitched plies are offset from one another, the creation of blind holes and blind channels results in significantly more internal cooling, while still maintaining some film cooling. Coupling the stitched plies with a more porous matrix in the CMC can create an even higher flow rate. Such porous matrices can be provided by, for example, adding acrylic, epoxy, or loose fugitive particles or fibers to the CMC slurry that are sintered out in a later step.

The invention is compatible with bare as well as prepregged ceramic reinforcing elements such as paper, felt or cloth. The process is initiated by cutting the ceramic fiber containing material to a preselected size, then laying up or stacking a preselected plurality of plies. Preferably, a pattern is inked on the top ply of the stacked "lay-up" to indicate where to sew or stitch fugitive threads. A fugitive fiber or thread is stitched with either a stitching or sewing machine along the inked patterned. A setting on the stitching or sewing machine dictates how many through-thickness fugitive fibers per inch are pushed through the stacked plies or lay-up. The fugitive thread can be any fiber that burns out during sintering such as nylon, rayon, cotton, and polyester threads. If a bare ceramic reinforcement element is used, then the stitched together plies are infiltrated with a slurry, which on heating, converts to a ceramic material. As previously discussed, adding a fugitive material such as epoxy or acrylics to the slurry further enhances the flow characteristics of the CMC.

Next, the stitched laminate is consolidated, at a pressure of at least about 100 psi and at least about 175° F. More preferably, consolidation is at a pressure of at least about 200 psi and a temperature of at about 300° F. The resulting stitched, consolidated laminate is then sintered, preferably at nominally 1800° F. The fugitive threads burn out during the sintering operation, leaving holes and channels where the through fugitive threads or fibers were present prior to sintering or burning out, channels where any connecting threads were present prior to sintering such as where the needle thread carried across a ply as the sewing machine moved to the next stitch or where any bobbin threads connected stitches from the needle. Additionally, any optionally added fugitive material distributed in the matrix is burnt out, leaving porosity.

An object of the present invention is to obtain flow for the CMC component of at least about $7 \times 10^{-4}$ pounds per second per inch$^2$ of surface area (pps/in$^2$). This flow objective has been achieved in components formed using the stitching and nonporous CMC, as well as those formed by stitching using porous CMC (additional fugitive materials in the slurry), as illustrated in the following table:

| Structure | Flow (pps/in$^2$) |
| --- | --- |
| Base CMC | $<1 \times 10^{-4}$ |
| Porous CMC (128-7) | $8.2 \times 10^{-4}$ |
| Stitched CMC | Several $> 7 \times 10^{-4}$ to $12 \times 10^{-4}$ |

In an embodiment illustrated in FIG. 1, a ceramic structure 110 is shown as consisting of a plurality of plies 106, 108 of a ceramic reinforcing element. A plurality of cooling holes 112 and channels 114 are disposed throughout the plies 106, 108 in the ceramic component 10. The holes 112 and channels 114 are formed by the sintering of fugitive threads that are initially stitched into the ceramic reinforcement element plies 106, 108 and subsequently removed, as by vaporizing decomposing or burning using heat, to form the holes 112 and channels 114 where the thread was previously located. The holes 112 and channels 114 are shown as being spaced, elongated and parallel to each other although it is possible to orient the channels 114 in any functional direction along the top and bottom surface since the channels 114 are formed by the connecting thread fibers between the holes for a first surface and the bobbin thread for a second surface during the stitching operation. The holes 112 are formed by the needle thread of the stitching or sewing machine and, therefore, run perpendicular to the top surface although the spacing between the holes 112 may be modified by changing the settings on the machine or by changing the distance between the inking patterns. The concentration of the channels 114 can vary from approximately 2 per inch to approximately 8 per inch in one or both directions while the holes 112 concentration can vary from approximately 3 per inch to approximately 8 per inch in one or both directions. The inner diameter of the holes 112 as well as the channels 114 is dependent upon the size of the fugitive thread, and may vary from approximately 0.003 inch for fine threads to approximately 0.015 to approximately 0.020 inch for heavier threads. The ceramic structure 110 shown in FIG. 1 is the basic structure that can be used for building other embodiments of the present invention having differing bulk material flow characteristics.

Figure 2:
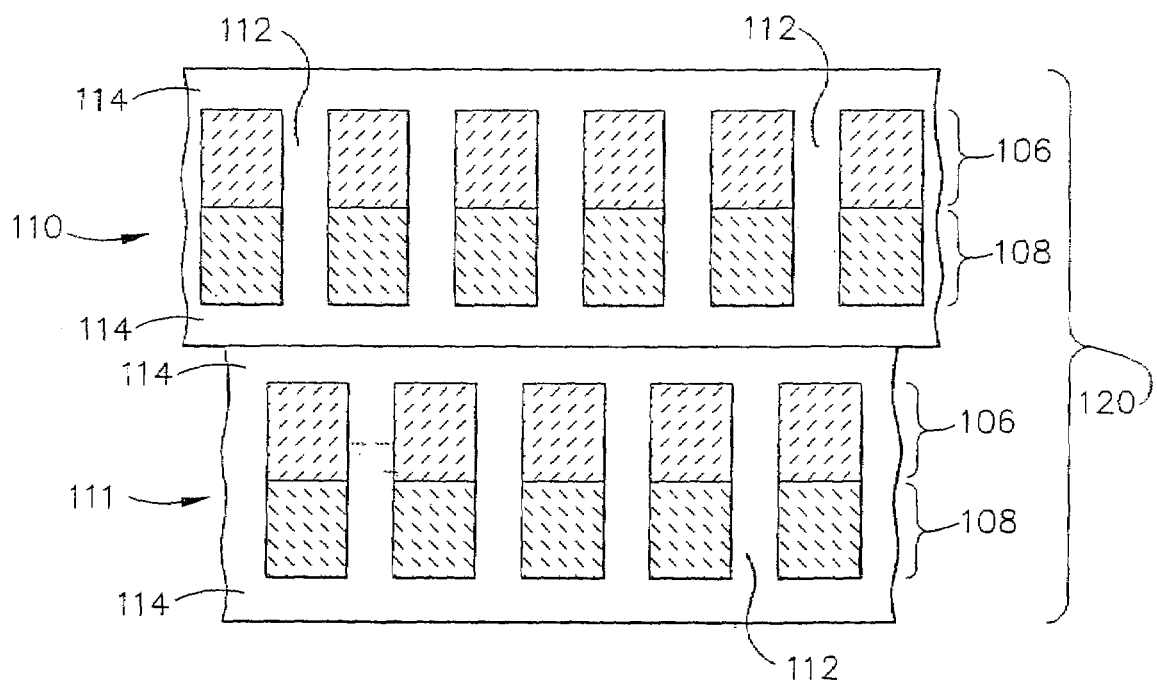
FIG. 2 is a cross-sectional view of a second embodiment of a ceramic structure of the present invention.

In another embodiment of the invention illustrated in FIG. 2, the bulk ceramic structure 120 is comprised of at least two ceramic substructures 110, 111. Here, the holes 112 of the two basic ceramic substructures 110, 111 are slightly offset from one another so as to increase the flow resistance of the combined bulk ceramic structure 120. The thickness of the basic ceramic substructures 110, 111 as well as the direction and concentration of holes 112 and channels 114 are shown being equal in both basic ceramic structures 110, 111 although, it is possible to vary the thickness of each basic ceramic structure 110, 111 by varying the ceramic reinforcing element type and/or the number of plies used in each substructure 110, 111. Additionally, the size, direction and concentration of the holes 112 and channels 114 can vary in each basic ceramic substructure 110, 111. The thickness of the basic ceramic substructure 110, 111 can vary from approximately 0.005 inch for 1 ply of thin ceramic paper to within approximately 0.005 inch of the total thickness of the bulk ceramic structure 120. The variations in basic ceramic substructure 110, 111 thicknesses, hole 112 concentration, and channel 114 concentration in each basic ceramic substructure 110, 111 allows the practitioner to modify the surface and internal flow of the bulk ceramic structure 120, which ultimately changes its cooling characteristics.

In yet another embodiment of the process of the present invention, the bulk ceramic structure 120 is composed of a basic ceramic substructure 110, 111 having at least one ceramic reinforcing element ply 106, 108 which hasn't been stitched on the outside surfaces. This can be accomplished by overlying, or overlapping, one or more unstitched outside plies 106, 108 of a ceramic reinforcing element over the previously stitched plies 106, 108 of the basic substructure 110, 111. The thickness of the outside ceramic composite can be equal to the inner ceramic composite, or may vary. Alternatively, it is possible to vary the thickness of each ceramic composite ply 106, 108 or completely eliminate the ceramic composite ply 106, 108 from the top or bottom of the basic substructure 110, 111. The ceramic composite plies 106, 108 can vary from very low flow materials such as tightly woven cloth reinforced ceramic composites to very high flow materials such as low tow count woven cloth reinforced or low fiber density ceramic papers or ceramic felts. However, the thickness of the ceramic composite plies is preferably thin, ranging between about 0.005 inch to about 0.020 inch thick. The variations in thickness and in flow capabilities of the ceramic composite plies allows the designer the flexibility to modify the surface and internal cooling of the bulk ceramic composite structure 120.

A wide variety of ceramic composite matrixes can be used to make the ceramic structure of the present invention. Suitable ceramic composite matrices include oxide fiber reinforced oxide matrix composites as well as non-oxide fiber (such as SiC) reinforced oxide and non-oxide matrices. The ceramic composite matrix preselected for the present invention is dependent upon the desired application of the ceramic structure. Additionally, the selected ceramic composite matrix should be compatible with an oxidizing environment during its processing or be amenable to a post-processing oxidizing environment since the fugitive fibers are removed from the structure by decomposing/vaporizing at elevated temperatures in an oxidizing environment.

Fugitive fibers may be made of any material that can be sewed or stitched on a sewing or stitching machine and which may be removed leaving little or no residue. Fugitive fibers are typically made of nylon, rayon, or cotton produced as threads or monofilaments due to their low cost and availability. Additionally, other fibers, such as carbon fibers, may be used.

Figure 3:
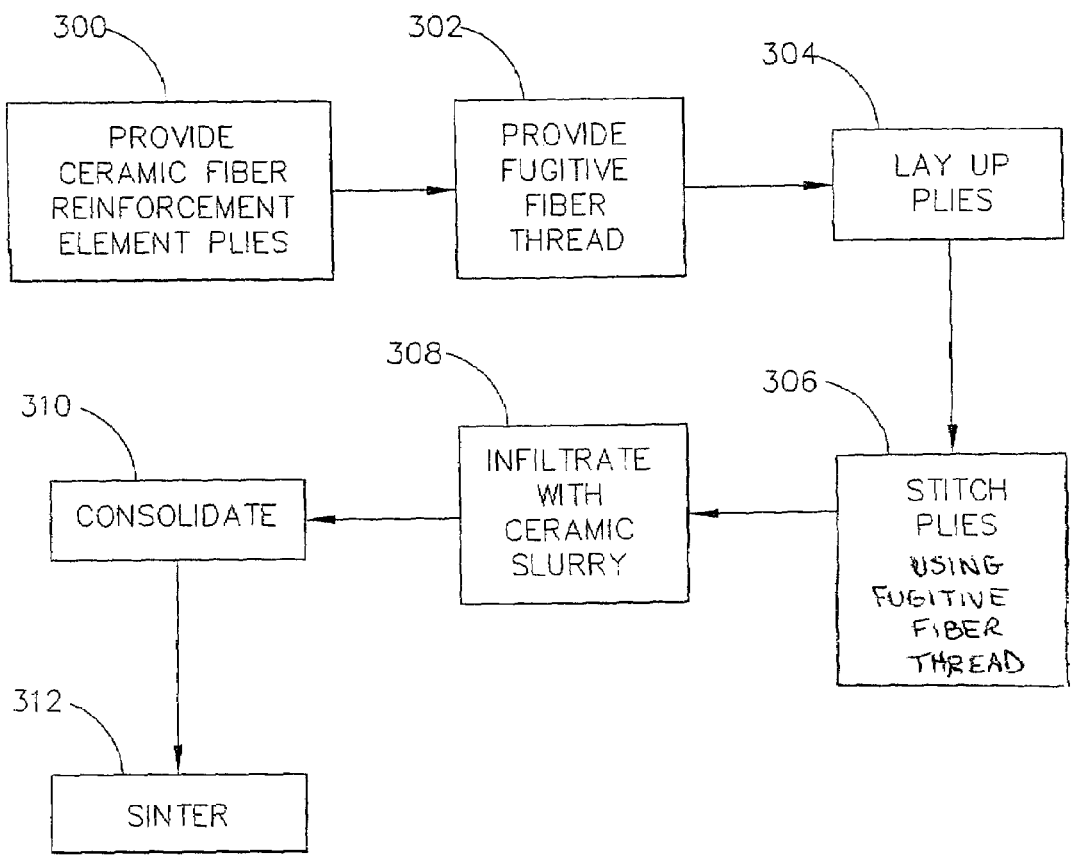
FIG. 3 illustrates a schematic representation of one embodiment of a method of the current invention for fabricating a CMC having cooling holes and channels.

As shown in FIG. 3 the present invention includes novel processes of making ceramic composite structures having holes and channels to increase flow. In one embodiment shown in FIG. 3, the process is initiated by providing a ceramic fiber reinforcing element in the form of plies of ceramic cloth, paper or felt. Next, fugitive fibers in the form of threads or monofilaments that are capable of being sewn or stitched on a machine are provided. The fugitive fibers may be stitched through the ceramic composite prior to or after the ceramic reinforcing element has been prepregged. When stitching the fugitive fibers prior to prepregging, a pattern is preferably directly inked on one outside ply. The plies may optionally be de-sized (usually a heat cleaning process to remove any protective coating on the ceramic fibers), or may be supplied as provided without further desizing. Multiple plies of the ceramic fiber-reinforcing element are laid up as required by the component design, with the inked pattern ply placed on top of the stack. The stacked plies are then sewn or stitched using the fugitive fibers on a sewing or stitching machine using the inked pattern as a guide. The machine is set to provide a predetermined number of holes per inch. Either a single stitched stack or multiple stitched stacks can be combined to meet the flow and structural requirements of the component design. The single or multiply stacks are then infiltrated with a ceramic slurry.

The ceramic slurry is comprised of a polymer substance that transforms upon heating to yield a ceramic phase, the polymer substance being dispersed in a liquid solvent vehicle to form a substantially uniform mixture. By way of non-limiting example, the slurry may be comprised of a solvent and a polymer substance selected from the group consisting of polycarbosilanes, vinylic polysilanes, dimethyl siloxane, silicone resins, and combinations thereof. The solvent is an organic solvent, and preferably comprises an alcohol such as isopropanol, ethanol, acetone, and combinations thereof. The slurry may also contain other ceramic particles, metallic particles, and/or binders without departing from the invention.

During the infiltration process the slurry is uniformly interspersed about the ceramic reinforcing element and the fibers, as a matrix mixture, to provide an element that is fully impregnated with a matrix precursor, otherwise known as an "impregnated" element. Such an impregnated element is then molded (or consolidated) under the influence of heat and pressure to form a preform, which is a polymer/ceramic matrix composite precursor member that is readily handled. The preform is subsequently heated (or sintered) in an oxidizing atmosphere, such as air, at a second processing temperature of at least the temperature required to transform the polymer substance to a ceramic phase, as well as to burn out the fugitive fibers, but less than that which will result in degradation of ceramic fibers in the preform. Such temperature should be in the range of about 600° C. to about 1200° C., depending on the nature of the reinforcing element, ceramic fibers and fugitive fibers. Such heating transforms the polymer substance, such as by decomposition, to a ceramic phase, which bonds together the ceramic particles from the slurry into a ceramic matrix.

In an alternative process embodiment, the fugitive fibers are stitched after the ceramic reinforcing element has been prepregged. The process is initiated by prepregging the ceramic reinforcing element with a ceramic slurry which is comprised of a polymer substance, which transforms upon heating to yield a ceramic phase, and ceramic particles dispersed in a liquid vehicle to form a substantially uniform mixture. During the prepregging process the slurry is uniformly interspersed about the ceramic reinforcing element as a matrix mixture to provide an element that is impregnated with the slurry. The prepreg element is cut or folded to form plies, and a pattern is preferably inked on the outside surface of at least one ply. Additional plies of the ceramic prepreg element are then stacked, folded, or laid up as required by the component design, with the inked pattern ply on top of the stack or layup. The stacked plies are sewn or stitched together using the fugitive fibers on a sewing or stitching machine, using the inked pattern as a guide. The machine is set to give a predetermined number of holes per inch. Either a single stitched stack or multiple stitched stacks can then be combined with each other or with prepegged unstitched ceramic reinforcing elements to meet the preselected requirements of the component. The single or combined stacks are then consolidated (molded under the influence of heat and pressure) to form a preform, which is a polymer matrix composite precursor member that is readily handled. The preform is subsequently sintered (heated in an oxidizing atmosphere, such as air), at a second processing temperature of at least the temperature required to transform the polymer substance to a ceramic phase as well as burn out the fugitive fibers, but less than that which will result in degradation of ceramic fibers in the preform. Such temperature may be in the range of about 600° C. to about 1200° C., depending on the nature of the reinforcing fibers. Such heating transforms the polymer substance, such as by decomposition, to a ceramic phase, which bonds together the ceramic particles from the slurry into a ceramic matrix.

In either process, removal of the fugitive fibers occurs during the sintering step at the second processing temperature, by decomposition/vaporization of the fugitive fibers due to both the high temperatures and the oxidizing environment. Removal of substantially all the fugitive fibers is critical for successful fabrication of ceramic composite structures with holes and channels. Inadequate cooling of the ceramic composite structures could occur if a significant amount of non-decomposed fugitive fibers remains in the structure or if a significant amount of residue from the fugitive fibers remains in the holes and channels after the second processing temperature.

The invention having been generally described, the following examples are given as a particular embodiment of the invention to demonstrate the practice and advantages thereof. It is understood that the examples are given by way of illustration and is not intended to limit in any manner the specification or the claims that follow.

EXAMPLE 1

In Example 1, evaluated in connection with the present invention, a Nextel® 440 ceramic cloth was cut into 4-in square plies. Nextel® 440 is made from $Al_2O_3$, $SiO_2$, and $B_2O_3$ at varying percentages, and has both crystalline and glassy phases—the glassy phase helps the fiber retain strength after exposure to high temperature, but also weakens the fiber when stressed at high temperature. is a registered trademark for ceramic textiles, and is owned by 3M Corporation, St. Paul, Minn., USA. On one ply, lines were inked on the surface about 0.75 cm apart from each other either along the warp direction of the ceramic cloth ply (1D) or in both the warp and fill directions (2D). Four plies were stacked together with the top ply being the one with the inked pattern. The stacked plies were stitched along the inked pattern with a #61 rayon thread on a ConSew® Premier Model No. CN3115RB sewing machine at a 2.5, 3.5 and 4.5 setting. Consew® is a registered trademark of Consolidated Sewing Machine Corp. of New York, USA. The settings correspond to about 6 stitches/cm, about 4 stitches/cm and about 3 stitches/cm, respectively. The stitched, stacked plies were infiltrated with a slurry containing a sub-micron silica powder suspended in a solution containing a $SiO_2$-yielding polymer dissolved in a 2 parts isopropanol/1 part ethanol mixture by submersing the stacked plies in the slurry followed by debulking the lay-up. The submerging/debulking operation was performed three times to ensure that the stitched stack was thoroughly infiltrated with the slurry. The infiltrated stack was bagged and autoclaved at 300° F. at 200 psi pressure to consolidate the preform. The preform was sintered in air at 1650° F.

EXAMPLE 2

In Example 2, a Nextel®440 ceramic cloth was prepregged with silica powder, $SiO_2$-yielding polymer slurry previously described in Example 1. The prepregged cloth was cut into 4 inch square plies, and 4 of these plies were stacked together as well as 2 sets of 2-ply thick laminates. A 1D patterned lines 0.75-cm apart were inked onto a 4-in square sheet of plastic. Additionally, a 2D pattern with lines 0.75-cm apart were inked onto 2,4-in square plastic sheets. A 1D patterned plastic sheet was placed on top of the 4-ply thick stack while the 2D patterned plastic sheets were placed on both of the 2-ply thick stacks. The stacked prepreg lay-ups were stitched along the inked pattern with a #61 rayon thread on a ConSew sewing machine with a machine setting of 3.5. The two 2-ply stitched lay-ups were offset from each other about 0.37 cm in both the warp and fill cloth directions, stacked and lightly pressed together to stabilize the offset. The stitched prepregged stacks were bagged and autoclaved at 300° F. at 200 psi pressure to consolidate the preform. The preform was sintered in air at 1650° F.

The flow of the component specimens produced through the processes described in Example 1 and Example 2 are shown in Table 2. The flows are compared at a constant pressure ratio of 1.2. Also shown is the flow of a Nextel® 440 ceramic cloth-reinforced CMC without any fugitive fibers.

TABLE 2

Flow for CMC's with Differently Stitched Fugitive Fibers

| Specimen Condition | Spacing/Orientation/ Machine Setting | Flow @ 1.2 $P/P_{atm}$ (pps/in$^2$) |
|---|---|---|
| CMC | — | $0.9 \times 10^{-4}$ |
| Example 1 | 0.75-cm/1D/4.5 | $7.0 \times 10^{-4}$ |
| " | 0.75-cm/1D/3.5 | $7.9 \times 10^{-4}$ |
| " | 0.75-cm/1D/2.5 | $8.6 \times 10^{-4}$ |
| " | 0.75-cm/2D/3.5 | $11.2 \times 10^{-4}$ |
| Example 2 | 0.75-cm/1D/3.5 | $8.9 \times 10^{-4}$ |
| " | 0.75-cm/2D Offset/3.5 | $6.5 \times 10^{-4}$ |

The results shown in Table 2 indicate that the holes and channels left behind after removal of the fugitive fibers change the flow-through capabilities of a ceramic composite. The flow characteristics of a ceramic composite can be further controlled and modified by stitching different preselected patterns and preselected concentrations of various fugitive fibers into the CMC, as well as by selecting the different slurry components to vary the porosity of the CMC.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of manufacturing a structural fiber reinforced porous ceramic matrix composite member having a predetermined pattern of cooling holes and channels therein, the cooling holes and channels formed by a process comprising the steps of:
providing at least one ply of ceramic fiber material;
stitching at least one fugitive thread through the at least one ply of ceramic fiber material in at least one preselected pattern;
infiltrating the ceramic fiber material with a ceramic slurry;
consolidating the infiltrated ceramic fiber material; and
sintering the laminated and infiltrated ceramic fiber material at a temperature sufficient to decompose the at least one fugitive thread but not sufficient to damage the ceramic fiber material, leaving at least one hole and at least one channel in the ceramic matrix composite component member in place of the at least one fugitive thread.

2. The method of claim 1, wherein the ceramic fiber material is selected from the group consisting of ceramic paper, ceramic cloth, and ceramic felt.

3. The method of claim 2, wherein the fugitive thread is comprised of a material selected from the group consisting of nylon, polyester, rayon, cotton, and carbon fiber.

4. The method of claim 3, further comprising of the step of inking the predetermined pattern on at least one ply prior to the step of stitching.

5. The method of claim 3, wherein the step of infiltrating the ceramic fiber material is performed prior to the step of stitching at least one fugitive thread through the at least one ply of ceramic fiber material in a preselected pattern.

6. The method of claim 3, wherein the at least one ply of ceramic material is comprised of a plurality of stacked plies.

7. The method of claim 6, further comprising the step of combining a plurality of stitched plies having similar stitching patterns and offsetting the stitched plies from each other prior to performing the step of consolidating.

8. The method of claim 6, further comprised of the step of combining a plurality of stitched plies having different stitching patterns prior to performing the step of consolidating.

9. The method of claim 6, wherein the step of consolidating is performed at a preselected pressure of at least 200 psi and a temperature of at least 300° F.

10. The method of claim 6, wherein the step of sintering is performed at a preselected temperature in the range of between about 1100° F. to about 2100° F.

11. The method of claim 1, wherein the holes and channel have an average diameter in the range of about 0.003 inches to about 0.020 inches.

12. The method of claim 1, wherein the resulting composite matrix composite member has an air flow rate of about $7 \times 10^{-4}$ pps/in$^2$ (at a constant pressure ratio of 1.2 P/Patm).

13. A method of manufacturing a structural fiber reinforced porous ceramic matrix composite member having a predetermined pattern of cooling holes and channels therein, the cooling holes and channels formed by a process comprising the steps of:
providing at least one ply of ceramic fiber material;
stitching at least two fugitive threads through the at least one ply of ceramic fiber material in at least one preselected pattern, the at least two fugitive threads comprising a needle thread and a bobbin thread;
infiltrating the ceramic fiber material with a ceramic slurry;
consolidating the infiltrated ceramic fiber material; and
sintering the laminated and infiltrated ceramic fiber material at a temperature sufficient to decompose the at least two fugitive threads but not sufficient to damage the ceramic fiber material, leaving at least two channels in the ceramic matrix composite component member in place of the at least two fugitive threads.

14. The method of claim 13, wherein the ceramic fiber material is selected from the group consisting of ceramic paper, ceramic cloth, and ceramic felt.

15. The method of claim 14, wherein the fugitive threads are comprised of a material selected from the group consisting of nylon, polyester, rayon, and carbon fiber.

16. The method of claim 15, further comprising of the step of inking the predetermined pattern on at least one ply prior to the step of stitching.

17. The method of claim 15, wherein the step of infiltrating the ceramic fiber material is performed prior to the step of stitching at least two fugitive threads through the at least one ply of ceramic fiber material in a preselected pattern.

18. The method of claim 15, wherein the at least one ply of ceramic material is comprised of a plurality of stacked plies.

19. The method of claim 18, further comprising the step of combining a plurality of stitched plies having similar stitching patterns and offsetting the stitched plies from each other prior to performing the step of consolidating.

20. The method of claim 18, further comprised of the step of combining a plurality of stitched plies having different stitching patterns prior to performing the step of consolidating.

* * * * *

UNITED STATES PATENT AND TRADEMARK OFFICE
CERTIFICATE OF CORRECTION

PATENT NO. : 7,153,464 B2
APPLICATION NO. : 10/725279
DATED : December 26, 2006
INVENTOR(S) : Millard et al.

It is certified that error appears in the above-identified patent and that said Letters Patent is hereby corrected as shown below:

Claim 13, Col. 10, Line 7, "pattem" should be --pattern--

Claim 13, Col. 10, Line 14, "pattem" should be --pattern--

Signed and Sealed this

Fifteenth Day of May, 2007

JON W. DUDAS
*Director of the United States Patent and Trademark Office*